(12) United States Patent
Tardif et al.

(10) Patent No.: US 6,244,529 B1
(45) Date of Patent: Jun. 12, 2001

(54) MANUALLY-OPERATED GARLIC GRATER

(75) Inventors: Pierre Tardif, Longueuil (CA); George Bigelow, Sr.; George Bigelow, Jr., both of Chai Wan (HK)

(73) Assignees: Desing Pierre Tardif Inc.; Les Entreprises Yvan Laporte Inc., both of Longueil (CA)

( * ) Notice: Subject to any disclaimer, the term of this patent is extended or adjusted under 35 U.S.C. 154(b) by 0 days.

(21) Appl. No.: 09/603,553

(22) Filed: Jun. 26, 2000

(51) Int. Cl.$^7$ ............................. A47J 43/25; A47J 43/28; B02C 19/20
(52) U.S. Cl. ............................. 241/93; 99/495; 99/510; 241/100; 241/169.1; 241/273.3
(58) Field of Search ............................. 99/495, 510–513; 241/92, 93, 100, 169.1, 222, 273.1, 273.2, 273.3, 278.1, 280; 426/112, 115, 124, 130

(56) References Cited

U.S. PATENT DOCUMENTS

| | | | |
|---|---|---|---|
| D. 255,861 | * | 7/1980 | Hsu ........................................ D7/678 |
| 913,187 | * | 2/1909 | Arnstein .................................. 241/93 |
| 1,097,519 | * | 5/1914 | Blair ....................................... 99/510 |
| 1,456,651 | * | 5/1923 | Rieman .................................. 99/510 |
| 1,683,679 | * | 9/1928 | Knowlton ............................... 99/510 |
| 2,137,366 | * | 11/1938 | Sundstrand ............................. 241/93 |
| 3,581,790 | * | 6/1971 | Del Conte ........................... 241/169.1 |
| 3,642,045 | * | 2/1972 | Buvelot .............................. 241/273.2 |
| 3,912,176 | * | 10/1975 | Mantelet ................................. 241/93 |
| 4,082,230 | * | 4/1978 | Bounds .................................. 241/92 |
| 4,921,174 | * | 5/1990 | Okada et al. .......................... 99/510 |
| 5,071,663 | * | 12/1991 | Dugan ................................... 241/95 |
| 5,364,037 | | 11/1994 | Bigelow . |
| 5,562,256 | * | 10/1996 | Wolman et al. .................. 241/169.1 |

* cited by examiner

*Primary Examiner*—Timothy F. Simone
(74) *Attorney, Agent, or Firm*—Robic

(57) ABSTRACT

Disclosed is a manually-operated garlic grater which is very easy to use and very efficient to grate cloves of garlic. This garlic grater has a casing defining a tubular cavity having a lateral opening. A handle is removably mounted in a rotatable manner onto the casing on top of one end of the tubular cavity. A hollow grating drum is rigidly connected to the handle so as to be rotated therewith. This drum extends within the tubular cavity when the handle is mounted onto the casing and has a cylindrical wall which extends at a short distance away from the inner wall of the tubular cavity. The handle and hollow grating drum altogether form one piece. A base is removably mounted onto the casing on top of the other ends of the tubular cavity. A wiper is rigidly connected to the base. This wiper extending radially within the drum when the base is mounted on the casing and bearing against the cylindrical wall of the drum to wipe the cylindrical wall when the drum is rotated. The base and wiper altogether form another one-piece. A door is pivotally mounted onto the casing so as to be manually foldable onto the lateral opening of the tubular cavity of the casing. This door has an inner surface acting as a pusher to press a glove of garlic to be grated through the lateral opening against the grating drum. The above grater is interesting in that it is compact in size and made of a few pieces easy to assemble and separate, thereby making its use and cleaning easy to carry out.

8 Claims, 3 Drawing Sheets

US 6,244,529 B1

MANUALLY-OPERATED GARLIC GRATER

BACKGROUND OF THE INVENTION a) Field of the Invention

The present invention relates to a kitchen utensil. More specifically, it relates to a manually-operated garlic grater for use to peel off and grate cloves of garlic or other similar products, such as small onions.

b) Brief Description of the Prior Art

To obtain garlic juice and gratings for spicing or flavoring a food preparation, it is of common practice to take a clove of garlic, to peel off the skin of the clove with a knife, and then either to chop the peeled clove with the knife or to grate it with a flat grate.

Garlic presses are also known, comprising a small container provided with a perforated bottom, in which a clove of garlic previously peeled off can be inserted and pressed with a handle. The clove that is so pressed is crushed and converted into juice and gratings while it passes through the perforations at the bottom of the casing.

In both cases, it is compulsory to peel off the cloves prior to processing them. It is also compulsory to use a knife or a scraper to collect the gratings that stick onto the bottom of the grate or the perforated bottom of the garlic press, because of their moisture content.

SUMMARY OF THE INVENTION

An object of the present invention is to provide a manually-operated garlic grater which is very easy to use and very efficient to grate cloves of garlic.

Another object of the invention is to provide a manually-operated garlic grater which is compact in size and made of a few pieces easy to assemble and separate, thereby making its use and cleaning easy to carry out.

In accordance with the invention, these objects are achieved with a manually-operated garlic grater comprising a casing defining a tubular cavity having an inner wall, a lateral opening and a pair of opposite open ends.

A handle is removably mounted in a rotatable manner onto the casing on top of one of the open ends of the tubular cavity. A hollow grating drum is rigidly connected to the handle so as to be rotated therewith. This drum extends within the tubular cavity when the handle is mounted onto the casing and comprises a cylindrical wall with punched holes defining outwardly projecting cutting teeth, this wall extending at a short distance away from the inner wall of the tubular cavity. As can be understood, the handle and hollow grating drum altogether form one piece.

A base is removably mounted onto the casing on top of the other one of the open ends of the tubular cavity. A wiper is rigidly connected to the base. This wiper extending radially within the drum when the base is mounted on the casing and bearing against the cylindrical wall of the drum to wipe the cylindrical wall when the drum is rotated. As can be understood, the base and wiper altogether form another one-piece.

Last of all, a door is pivotally mounted onto the casing so as to be manually foldable onto the lateral opening of the tubular cavity of the casing. This door has an inner surface acting as a pusher to press a glove of garlic to be grated through the lateral opening against the grating drum.

BRIEF DESCRIPTION OF THE DRAWINGS

The invention will be better understood upon reading the following non-imitative description of a preferred embodiment thereof, given with reference to the accompanying drawings in which.

DESCRIPTION OF A PREFERRED EMBODIMENT OF THE INVENTION

Figure 1:
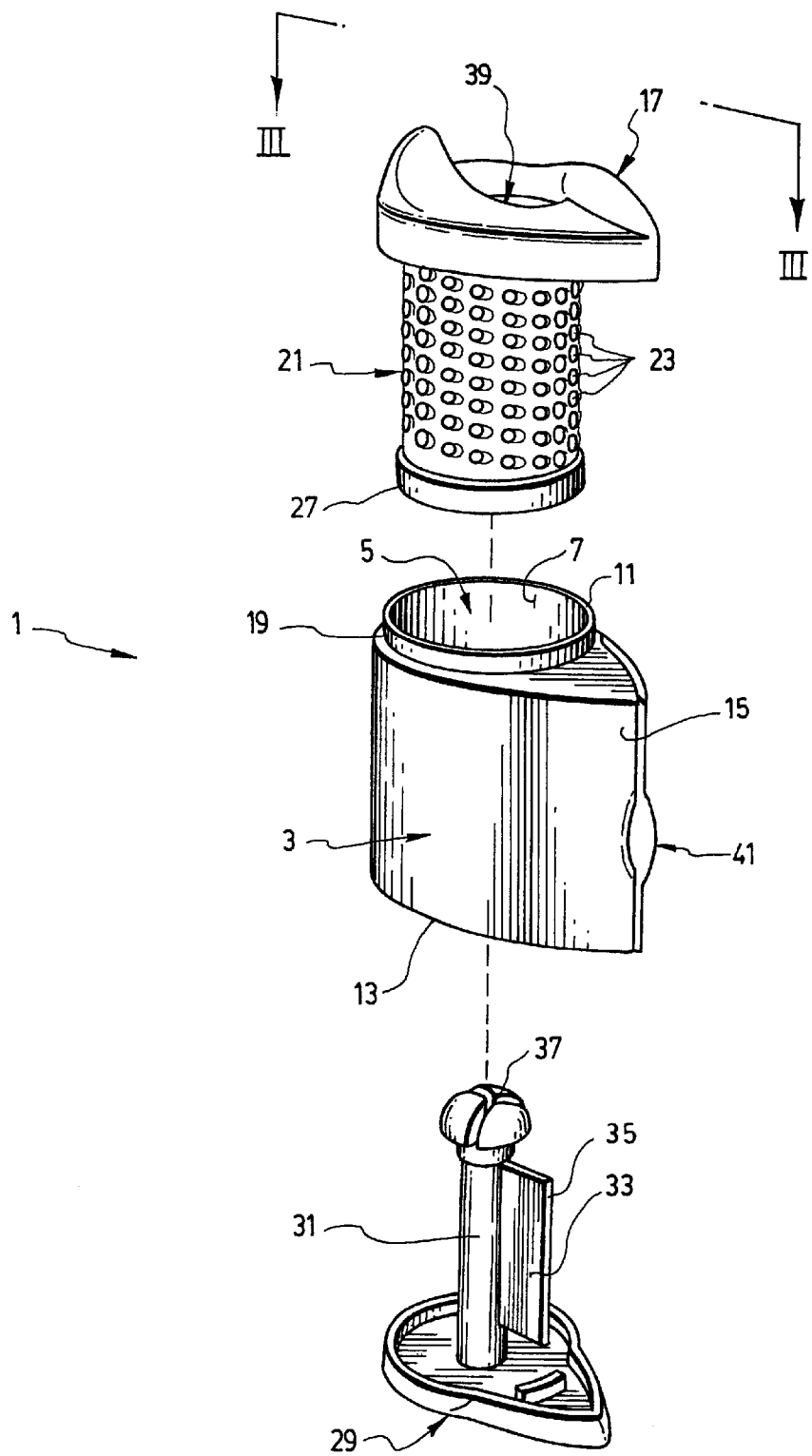
FIG. 1 is an exploded perspective view of a garlic grater according to the invention.

The manually-operated garlic grater 1 according to the invention as shown in the accompanying drawings comprises a casing 3 defining a tubular cavity 5 having an inner wall 7, a lateral opening 9 and a pair of opposite open ends 11, 13. In the illustrated embodiment, the casing 3 is shaped as a drop when seen in horizontal cross-section and thus has a tapering tip 15.

A handle 17 is removably mounted in a rotatable manner onto the casing 3 on top of the upper open end 11 of the tubular cavity 5. For this purpose, the casing 3 is provided with an integral, upwardly projecting round-shaped flange 19 surrounding the upper open end 11 of the tubular cavity 5. The flange acts as a support and a guide for the handle 17 when the same is fitted on it (see FIG. 3).

A hollow grating drum 21 is rigidly connected to the handle 17 so as to be rotated therewith. As is shown, the drum 21 extends within the tubular cavity 5 when the handle is mounted onto the casing 3 and comprises a cylindrical wall with punched holes define outwardly projecting cutting teeth 23. As is also shown (see FIG. 3), the cylindrically wall of the drum 21 extends at a short distance away from the inner wall 7 of the casing 3 to have a space in between.

Figure 3:
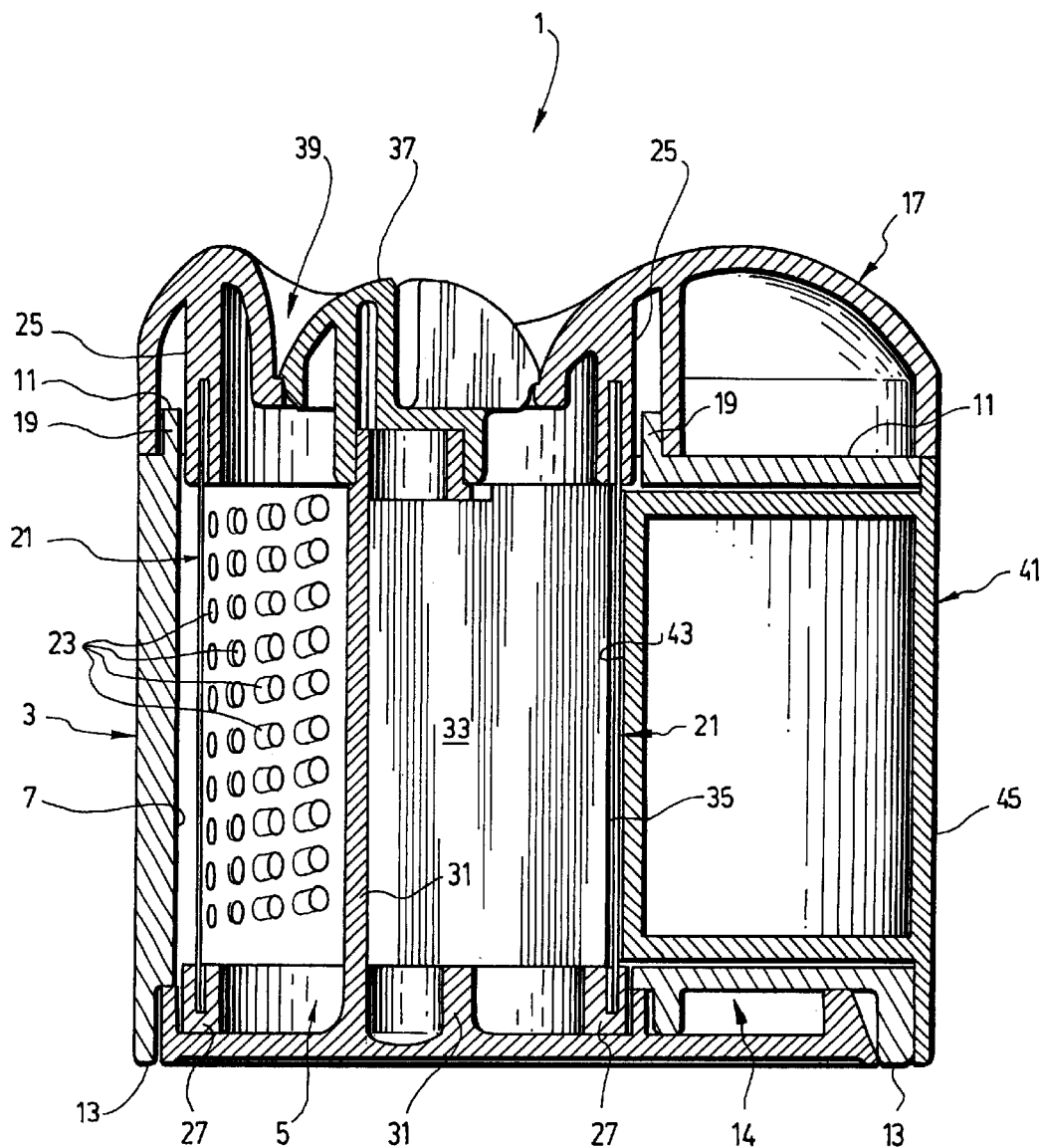
FIG. 3 is a cross-sectional view taken along line III—III, of the garlic grater shown in FIG. 1.

As is better shown in FIG. 3, the cylindrical wall of the grating drum 21 has an upper end connected to an upper ring 25 integral to the handle 17. It also has a lower end connected to a lower ring 27. The upper and lower rings 25, 27 are sized to snugly fit into the tubular cavity 5 so as to hold the drum 21 with the tubular cavity the cylindrical wall of the drum at the above mentioned short distance away from the inner wall 7 of the casing 3.

A base 29 is removably mounted onto the casing 3 on top of the lower end 13 of the tubular cavity 5. The base 29 comprises an upwardly projecting stem 31 extending coaxially within the drum 21 when the grater 1 is assembled. The stem 31 acts as a support for a wiper 33 which preferably consists of a flat piece of rubber material. Preferably, the casing 3 is shaped to define a recess 14 all around the lower open end 13 of the tubular cavity 5 and the base 29 is shaped to snugly fit into the so-defined recess 14 (see FIG. 3). Preferably also, the recess 14 is drop-shaped to prevent the base 29 from being inadvertently rotated.

As is better shown in FIGS. 1 and 3, the wiper 33 is rigidly connected to the stem 31 projecting from the base 29 so as to extend radially within the drum when the base 29 is mounted on the casing 3. The wiper 33 is also sized to bear against the cylindrical wall of the drum 21 to wipe this cylindrical wall when the drum is rotated. For this purpose, the piece of rubber forming the wiper is devised to have a straight edge 35 forming a straight continuous line of a contact with the cylindrical wall of the drum 21 (see FIG. 3).

The stem 31 has a free end opposite to the base. A button 37 is fixed to this free end. This button 37 is positioned to extend through a central opening 39 that is coaxial to the stem and made in the handle 17. Advantageously, the button is sized to snapped into the opening 39, thereby allowing detachable connection of the handle 17 to the base 29 in operative position on both sides of the casing 3.

Figure 2:
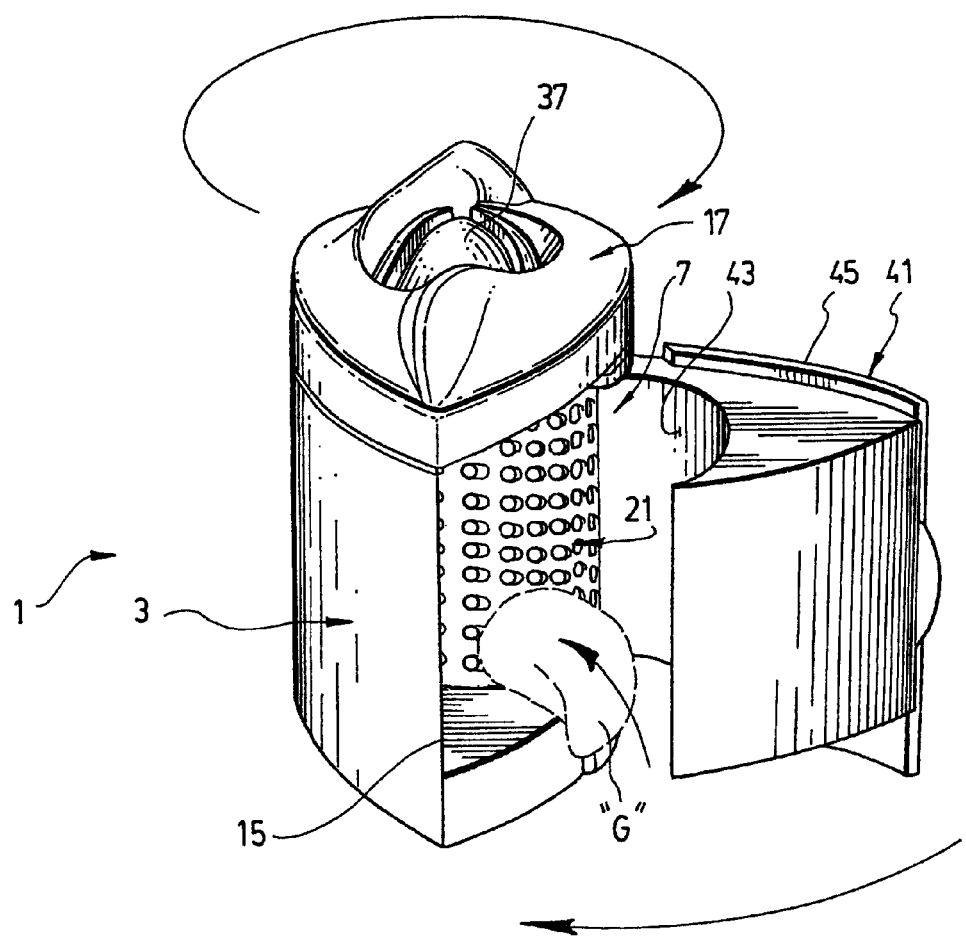
FIG. 2 is a perspective view of the garlic grater shown in FIG. 1, ready to be used.

Last of all, a door 41 is pivotally mounted onto the casing 3 so as to be manually foldable onto the lateral opening 7 of the tubular cavity 5 of the casing. The door 41 has an inner surface 43 which, in use (see FIG. 2), acts as a pusher to press a clove of garlic "G" to be grated through the lateral opening 7 against the grating drum 21.

In the illustrated embodiment, the door 41 has a crescent-shaped horizontal cross-section with a concave inner surface 43 and a convex outer surface 45. This door 41 is integrated into the tip 15 of the casing 3 and foldably mounted about a pair of aligned pivot pins (not shown).

The casing 3, handle 17, base 29, stem 31, button 37, upper and lower rings 25 and 27 and lateral door 41 are preferably made of moulded plastic material. The grating drum 21 is made of metal and the wiper 23 is made of rubber. However, other materials could be used without departing from the scope of the present invention.

As can now be understood, pressing of a clove of garlic "G" onto the drum 21 with the handle 41 will cause the skin of this clove to be torn out by the teeth 23 of the drum and to accumulate within the space left between the drum 21 and the inner wall 7 of the casing 3. Then, the clove will be grated and the juice and gratings formed inside the drum will be collected by the wiper 33 and dropped down onto the upper surface of the base 29. Thus, direct hand-contact with the garlic juice or gratings will be avoided.

What is claimed is:

1. A manually-operated garlic grater comprising:

a casing defining a tubular cavity having an inner wall, a lateral opening and a pair of opposite open ends;

a handle removably mounted in a rotatable manner onto the casing on top of one of the open ends of the tubular cavity;

a hollow grating drum rigidly connected to the handle so as to be rotated therewith, said drum extending within the tubular cavity when the handle is mounted onto the casing and comprising a cylindrical wall with punched holes defining outwardly projecting cutting teeth, said wall extending at a short distance away from the inner wall of the tubular cavity;

a base removably mounted onto the casing on top of the other one of the open ends of the tubular cavity;

a wiper rigidly connected to the base, said wiper extending radially within the drum when the base is mounted on the casing and bearing against the cylindrical wall of said drum to wipe said cylindrical wall when the drum is rotated; and a door pivotally mounted onto the casing so as to be manually foldable onto the lateral opening of the tubular cavity of said casing, said door having an inner surface acting as a pusher to press a clove of garlic to be grated through the lateral opening against the grating drum.

2. The garlic grater of claim 1, wherein the base comprises an upwardly projecting stem extending coaxially within the drum when the grater is assembled, said stem acting as a support for the wiper, said wiper consisting of a piece of material having a straight edge forming a straight continuous line of contact with the cylindrical wall of the drum, said stem having a free end opposite to the base.

3. The garlic grater of claim 2, wherein the cylindrical wall of the grating drum has an upper end connected to an upper ring integral to the handle, and a lower end connected to a lower ring, said upper and lower rings being sized to snugly fit into the tubular cavity so as to hold the drum with said tubular cavity with said cylindrical wall at said short distance away from the inner wall of said casing.

4. The garlic grater of claim 3, wherein the casing is provided with an integral, upwardly projecting round-shaped flange surrounding the one open end of the tubular cavity, said flange acting as a support and a guide for the handle when the same is fitted on it.

5. The garlic grater of claim 4, wherein the handle is provided with a central opening coaxial with the stem projecting from the base and wherein said grater further comprises a button fixed to the free end of said stem, said button being sized and positioned to extend through the central opening of the handle and be snapped thereto.

6. The garlic grater of claim 5, wherein the casing has a drop-shaped horizontal cross-section with a tapering tip and wherein the door has a crescent-shaped horizontal cross-section with a concave inner surface and a convex outer surface, said door being integrated into the tip of the casing.

7. The garlic grater of claim 6, wherein the casing is shaped to define a recess all around the other open end of the tubular cavity and wherein the base is shaped to snugly fit into the so-defined recess, said recess being so shaped as to prevent the base from being inadvertently rotated.

8. The garlic grater of claim 7, wherein:

said casing, handle, base, stem, button, upper and lower rings and lateral door are made of moulded plastic material;

said grating drum is made of metal; and said wiper is made of rubber.

* * * * *